3,240,815
PREPARATION OF B-ORGANO-SUBSTITUTED PHOSPHINOBORINES
Ross I. Wagner, Whittier, and Marvin H. Goodrow, Claremont, Calif., assignors to American Potash & Chemical Corporation, Los Angeles, Calif., a corporation of Delaware
No Drawing. Filed Apr. 30, 1962, Ser. No. 191,296
13 Claims. (Cl. 260—606.5)

The present invention relates, in general, to the preparation of phosphinoborine polymers in which the boron atoms are organo-substituted. More specifically, the invention relates to the preparation of B-organo-substituted phosphinoborine polymers by reacting certain organometallic reagents with certain B-halophosphinoborine polymers.

It is known that phosphinoborine polymers are of value where high thermal and hydrolytic stability are desired. These materials are also known for their value as high temperature dielectric materials. One specific application for these materials is as laminating resins which, when used, for example, in combination with fibre glass, are very resistant to thermal, chemical and electrical attack.

It is often desired to vary the physical properties of phosphinoborine polymers to meet the needs of a specific application. Considerable difficulty has been encountered in tailoring specific phosphinoborine polymers to the desired characteristics due to the difficulty of applying various organic substituents to the polymer. Selection of specific organic groups can control to a certain extent, for example, the solubility, melting point and compatibility of a polymer in a given system.

The preparative method heretofore available for the manufacture of B-organo-substituted phosphinoborine compounds are in certain respects more difficult to carry out when it is desired to manufacture B-organo-substituted phosphinoborine polymers having diverse organo-substituents attached thereto.

Broadly, in accordance with the present invention, it has been determined that B-organophosphinoborine polymers can be prepared by treating the corresponding B-halophosphinoborine polymers with certain organometallic reagents.

More specifically, the process of the present invention comprises reacting (I) a B-halophosphinoborine polymer having any of the general formulas:

(1) $[R_4R_3PBR_1R_2]_n$
(2) $[R_4R_3PBR_1R_2]_nA$
(3) $[R_2R_1BP(R_3)R(R_3)PBR_1R_2]_n$
(4) $[R_4R_3PBR_1R_2]_m[R_3PBR_1]_z$ mixtures and copolymers thereof, with (II) an organometallic reagent having the formula $(R_1)_xM$.

In the above formulas, $R_1$ and $R_2$ are each independently taken from the following group: halogen, hydrogen, aryl, alkyl, alkaryl and cycloalkyl substituents; at least one of said $R_1$ and $R_2$ being halogen in each of said polymers (1), (2), (3) and (4), each $R_1$ and $R_2$ substituent being independently selected for each monomeric unit. The substituents, $R_3$ and $R_4$, can be any of the single substituents, alkyl, aryl, alkaryl or cycloalkyl, each substituent being independently selected for each monomeric unit; or taken together as one single substituent, arylene, alkylene, alkarylene or cycloalkylene. The substituent R can be any of arylene, alkylene, alkarylene or cycloalkylene.

The integer $n$ is indicative of the degree of polymerization of the polymers. The ratio of the integers $m$ to $z$ in the polymer (4) is indicative of the extent of ring fusion and is between about 0.11:1 and about 6:1. The terminal groups of linear polymer (2) on one end of the chain are basic in nature, designated —A, and can conveniently be tertiary amines, tertiary phosphines, secondary amines or secondary phosphines. While we do not wish to be limited to any theory, it is believed that the other end of the polymer (2) is blocked by an acidic —$B(R_1)_3$ group wherein $R_1$ is as defined above.

Referring specifically to the organometallic reagent, $x$ is an integer equal to the valence of M, and M is a metallic element which can be a group IA, IIA, IIB or IIIA metal as is more fully described hereinafter. $R_1$ is as defined above provided that at least one $R_1$ substituent in each organometallic reagent is an organic substituent.

The B-halophosphinoborine polymers designated above as (1) through (4) are conveniently prepared by the halogenation of the corresponding B-hydridophosphinoborine polymer. One convenient method of halogenation is the treatment of the B-hydridopolymer with an N-halocarbamyl compound as is more specifically described in assignee's co-pending application Serial No. 191,272, filed April 30, 1962.

The B-organophosphinoborine polymers of this invention can be recovered, for example, from this reaction as a liquid, a solid, a solution dissolved in a suitable solvent or as a solid precipitate. The recovered polymer can be isolated by any of the conventional isolation procedures, such as crystallization, filtration and the like.

In order to illustrate the invention even more clearly, the following specific examples are set forth. It will be understood, of course, that these examples are for illustrative purposes only and are not intended to limit the invention in any way. In the following examples and throughout the specification and appended claims, all parts and percentages are by weight, unless otherwise indicated.

Examples I through XVI are illustrative of the preparation of compounds referred to hereinabove by (1), namely, cyclic B-organophosphinoborine polymers. Example XIV exemplifies the use of a Grignard reagent, and Example XV shows the formation of B-halophosphinoborine polymer in situ with an organometallic reagent. The reactants and the principal product obtained in Examples XVII through LV are set forth in Table II.

EXAMPLE I

A 0.1203 g. (0.365 mmole) quantity of $(CH_3)_6P_3B_3F_6$ is placed in a 5 ml. heavy-wall bomb tube. A seal-off tip is attached and 471 cc. (21.0 mmoles) of trimethylborine is added from the vacuum line. The sealed tube is heated at 100° C. for 144 hrs., whereafter a crystalline product forms on cooling to room temperature. After removal of the volatile components there remains a white solid residue. Sublimation of the residue in high vacuum at 85–125° C. gives 0.0971 g. of $(CH_3)_6P_3B_3(CH_3)$, M.P. 333–335° C.

EXAMPLE II

Into an 8 ml. heavy-walled bomb tube containing 0.1012 g. (0.236 mmole) of $[(CH_3)_2PBCl_2]_3$ is condensed (in vacuo) 3.0 ml. (2.25 g. of 3.12 mmoles) of trimethylaluminum. The sealed tube is heated in an oven at 125° C. for 16 hrs. after which the solution is clear and colorless. The tube is opened and the trimethylaluminum is removed leaving a white residue which is sublimed in high vacuum at 90–100° C. to give $[(CH_3)_2PB(CH_3)_2]_3$, M.P. 336–338° C., definitely characterized by its infrared spectrum.

EXAMPLE III

In a 5 ml. bomb tube is placed 0.1211 g. (0.283 mmole) of $[(CH_3)_2PBCl_2]_3$ and 0.5 ml. (0.35 g., 3.1 mmoles) of triethylaluminum is distilled into the tube from the vacuum line. The sealed tube is heated at 125±2° C. for 12 hrs. and opened on the vacuum line. After distilling the volatile material at a bath temperature of 60–65° C., there remains a viscous clear liquid which distills at a bath temperature of 135–160° C. to give 0.0836 g. of a viscous material that cannot be induced to crystallize on cooling. Crystallization from methanol yields 0.0130 g. of crude $$[(CH_3)_2PB(C_2H_5)_2]_3$$

M.P. 68–76° C., mol. wt. 403.5 (calcd. for $$[(CH_3)_2PB(C_2H_5)_2]_3$$

389.97).

EXAMPLE IV

A 0.1224 g. (0.286 mmole) sample of $$[(CH_3)_2PBCl_2]_3$$

is placed in a 7 ml. heavy-walled bomb tube and 0.5 ml. (0.69 g., 7.2 mmoles) of dimethylzinc is condensed into the tube from a vacuum line. The sealed tube is heated at 125° C. for 16 hrs., whereafter a clear colorless solution is observed. A crystalline precipitate forms when the solution cools to room temperature. A high vacuum system is used to remove volatile material from the tube. The resulting white residue is sublimed in high vacuum at 85–110° C. to provide 0.0800 g. of $[(CH_3)_2PB(CH_3)_2]_3$, M.P. 337–339° C., identifiable by its infrared spectrum.

EXAMPLE V

A 0.2176 g. (0.313 mmole) quantity of $$[(CH_3)_2PBBr_2]_3$$

is placed in a 6 ml. bomb tube equipped with a seal-off tip and 0.90 ml. (0.68 g., 9.43 mmoles) of trimethylaluminum are added from a vacuum line. The sealed tube is heated at 125±2° C. for 20 hrs. after which time all the solid material is dissolved. A small amount of methane is present when the tube is opened. The volatile components are removed from the tube in vacuo leaving a white solid product which sublimes in vacuo at 95–150° C. The solid is identified by its infrared spectrum as $[(CH_3)_2PB(CH_3)_2]_3$ (0.0912 g.), M.P. 333.5–335° C.

EXAMPLE VI

A 0.1217 g. (0.265 mmole) quantity of $$[(CH_3)_2PBHBr]_3$$

is placed in a 7 ml. bomb tube and 1.1 ml. (0.83 g., 11.5 mmoles) of trimethylaluminum is condensed into the tube. The sealed tube is heated at 125° C. for 18 hrs., opened, and found to contain no noncondensable gas. The condensable material is removed leaving a clear viscous liquid which is distilled at a bath temperature of 60–80° C. The distillate, 0.0595 g. of a waxy solid, is analyzed vapor phase chromatographically on an Apiezon L/Celite column at 300° C. The results, included in Table I, indicate $[(CH_3)_2PBHCH_3]_3$ to be the principal product containing lesser amounts of the unsubstituted, B-methyl-, B,B′-dimethyl-, and B,B′, B″-tetramethyl-derivatives.

EXAMPLE VII

A 0.2003 g. (0.5274 mmole) quantity of $$(CH_3)_6P_3B_3H_4Br_2$$

is heated with 1.45 ml. (1.09 g., 15.1 mmoles) of trimethylaluminum for 18 hrs. at 125–155° C. The reaction product is sublimed to yield 0.1007 g. of a semisolid which is analyzed by vapor phase chromatography. The results, listed in Table I, show $$(CH_3)_6P_3B_3H_4(CH_3)_2$$

to be the principal product.

EXAMPLE VIII

A 0.1045 g. (0.348 mmole) sample of $$(CH_3)_6P_3B_3H_5Br$$

and 0.2795 g. (1.273 mmoles) of diphenylzinc are placed in a 5 ml. heavy-wall bomb tube. The tube is evacuated, sealed and heated at 125±3° C. for 17 hrs. On cooling to room temperature a white crystalline material forms suspended in the viscous reaction medium. The tube is opened and 3 ml. of water is cautiously added to decompose excess diphenylzinc. The insoluble material, 0.0837 g., is collected, dried and fractionally sublimed in high vacuum. The product, $$(CH_3)_6P_3B_3H_5(C_6H_5)$$

in the amount of 0.0590 g., M.P. 101–102° C., is obtained at a bath temperature of 65–75° C., after first removing unreacted starting material at room temperature.

EXAMPLE IX

A 0.3192 g. (0.918 mmole) quantity of $$(CH_3)P_3B_3H_5I$$

is placed in a 5 ml. bomb tube and 1.00 ml. (0.752 g., 10.43 mmoles) of trimethylaluminum is added to the tube in vacuo. The sealed tube is heated at 100±2° C. for 9 hrs., cooled and opened under vacuum. No noncondensable gas is observed. After removal of the excess trimethylaluminum there remains a viscous oil which is distilled at room temperature and condensed at 0° C. to give a white solid. This solid melts on warming to room temperature. This solid is sublimed in vacuo at 40–60° C. to yield only one fraction, 0.1592 g., M.P. 35–60° C. On vapor phase chromatographic analysis on an Apiezon L/Celite column at 300° C., the product is found to consist of a spectrum of B-methyl derivatives, as listed in Table I, with the B-methyl and B,B′-dimethyl derivatives as the major products, the latter in greatest amount.

EXAMPLE X

A 0.1803 g. (0.519 mmole) quantity of $$(CH_3)_6P_3B_3H_5I$$

and 0.60 ml. (1.772 g., 7.68 mmoles) of dimethylmercury are heated at 175–250° C. for 8 hrs. Extensive decomposition is evidenced by the large globule of mercury in the tube and the 47.4 cc. of methane obtained when the tube is opened. Sublimation of the residue recovered after removal of most of unreacted dimethylmercury gives 0.0192 g. of a viscous material analyzing 82.5% dimethylmercury, 5.1% $(CH_3)_6P_3B_3H_6$, 1.6% $(CH_3)_6P_3B_3H_5(CH_3)$, 9.9% $(CH_3)_6P_3B_3H_4(CH_3)_2$, 0.4% $(CH_3)_2P_3B_3H_3(CH_3)_3$, and 0.4% $(CH_3)_6P_3B_3H_5I$ by vapor phase chromatography. The relative proportions of these materials are set forth in Table I.

EXAMPLE XI

A solution of 0.3345 g. (0.962 mmole) of $$(CH_3)_6P_3B_3H_5I$$

in 1.00 ml. (1.985 g., 13.9 mmoles) of dimethylcadmium is placed in a 5 ml. bomb tube which is sealed, evacuated and heated at 125–135° C. for 9 hrs. On cooling to room temperature a transparent crystalline material is deposited. The tube is opened on a vacuum line and 4.11 cc. of methane removed. After removal of the unreacted dimethylcadmium, the viscous gray residue is sublimed in high vacuum at bath temperatures up to 70° C. The 0.1944 g. sublimate is found by vapor phase chromatography to consist of a spectrum of B-methyl-derivatives as listed in Table I with the B-monomethyl-derivative predominating.

EXAMPLE XII

To 0.3198 g. (0.920 mmole) of $(CH_3)_6P_3B_3H_5I$ in a 5 ml. heavy-wall tube is added 228.6 cc. (10.21 mmoles) of dimethylzinc from a vacuum line. The sealed tube is heated at $100\pm2°$ C. for 9 hrs. whereafter it is opened. After removal of the unreacted dimethylzinc there remains a viscous residue which is sublimed in high vacuum. Vapor phase chromatographic analysis of the 0.1745 g. sublimate indicates that it is a mixture of B-methyl-derivatives as listed in Table I, with B-monomethyl the principal product.

EXAMPLE XIII

To the side arm of a 5 ml. heavy-walled tube is introduced 0.0974 g. (0.280 mmole) of $(CH_3)_6P_3B_3H_5I$. The tube is evacuated and filled with nitrogen. Employing a long needle syringe, 2.00 ml. (1.62 mmoles) of 0.81 M ethereal diphenylmagnesium solution is introduced. The tube is immediately evacuated after cooling to $-196°$ C. and the ether is cautiously distilled while maintaining the side arm at about $-20°$ C. to prevent loss of the $(CH_3)_6P_3B_3H_5I$. A light brown viscous residue which retains the ether of coordination remains. To the residue is added 1.0 ml. of benzene (in vacuo). The tube is then sealed above the side arm and removed from the vacuum line. After thoroughly washing the iodo compound from the side arm into the reaction tube, the latter is sealed below the side arm. On warming the mixture to room temperature a solution is obtained which after standing for several hours contains a light gray flocculent precipitate.

After heating at $125\pm5°$ C. for 20 hrs. the tube is opened on a vacuum line and the material volatile at room temperature is removed. The tube is then sealed onto a U-trap and subjected to high vacuum sublimation. The first fraction (0.0200 g.) sublimes at 25–80° C. and is found by vapor phase chromatography to be a mixture consisting of biphenyl, $(CH_3)_6P_3B_3H_6$ and $$(CH_3)_6P_3B_3H_5I$$

A second sublimate (0.0764 g.), which is obtained at a bath temperature of 100–230° C., is crystallized from absolute ethanol and to produce 0.0350 g. of white needles, M.P. 161–163° C. which analyzed by vapor phase chromatography on silicone grease/Celite at 340° C. as 1.2% $(CH_3)_6P_3B_3H_5(C_6H_5)$ and 98.8%

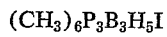
$(CH_3)_6P_3B_3H_4(C_6H_5)_2$.

An analytical sample having a M.P. of 163.164° C. is prepared by two crystallizations from absolute ethanol.

This procedure is repeated using the same technique and 0.1305 g. (0.375 mmole) of $(CH_3)_6P_3B_3H_5I$ with 3.00 ml. (2.43 mmoles) of 0.81 M diphenylmagnesium. The mixture is heated for 24 hrs. at $125\pm5°$ C. at which temperature it is completely homogeneous. On cooling to room temperature the viscous yellow mass eventually solidifies. After opening on the vacuum line and removing a small amount of volatile liquid the residue is sublimed in high vacuum through a $-78°$ C. bath. The first fraction (0.0267 g.) sublimes at a bath temperature of 60–80° C. and is found by vapor phase chromatography to consist of 11.8% $(CH_3)_6P_3B_3H_6$, 85.3% biphenyl, 0.05% $(CH_3)_6P_3B_3H_5I$ and 2.85% $(CH_3)_6P_3B_3H_5(C_6H_5)$.

The second sublimate (0.0638 g., M.P. 95–130° C.), collected at a bath temperature of 100–160° C., is resublimed to yield 0.0273 g. of $(CH_3)_6P_2B_3H_5(C_6H_5)$ M.P. 100–101° C., at a bath temperature of 50–75° C. The sublimation residue (0.0247 g.) analyzed by vapor phase chromatography (silicone grease/Celite at 340° C.) contains 38.2% $(CH_3)_6P_3B_3H_5(C_6H_5)$ and 61.8%

$(CH_3)_6P_3B_3H_4(C_6H_5)_2$.

Calculation of total yields on basis of the chromatographic data and the weights of the sublimates gives the following results: 4% $(CH_3)_6P_3B_3H_6$, trace $(CH_3)_6P_3B_3H_5I$, 34% $(CH_3)_6P_3B_3H_5(C_6H_5)$ 11% $(CH_3)_6P_3B_3H_4(C_6H_5)_2$. The relative yields of these compounds are set forth in Table I.

EXAMPLE XIV

A 1.00 ml. (30 mmoles) quantity of 3 M phenylmagnesium bromide in diethylether is syringed into a nitrogen-filled 5 ml. heavywall tube containing 0.1544 g. (0.444 mmole) of $(CH_3)_6P_3B_3H_5I$. The tube is immediately evacuated at $-196°$ C. and degassed. One milliliter of degassed ether is added and the tube sealed. On warming to room temperature the mixture becomes homogeneous. The tube is heated at $125\pm2°$ C. for 15 hrs., then opened on a vacuum line. After removal of the solvent the tacky brown residue is heated in high vacuum to obtain 0.0040 g. of crude $(CH_3)_6P_3B_3H_5(C_6H_5)$ at 100–125° C.

Hydrolysis of the sublimation residue with water, followed by a second sublimation, provides 0.0245 g. of yellow solid at 40–75° C., 0.0610 g. of a white solid at 150–170° C., and 0.0263 g. of a second white solid at 180–200° C. The first and second sublimates are combined and crystallized twice from ethanol-water (10:1) to yield mats of microcrystalline needles, 0.0112 g. of $(CH_3)_6P_3B_3H_4(C_6H_5)_2$, M.P. 161.5–163° C. Similar crystallization of the third sublimate yields an additional 0.0033 g. of the diphenyl-derivative raising the total of 0.0145 g. (0.0388 mmoles).

EXAMPLE XV

A 0.1635 g. (0.738 mmole) quantity of $(CH_3)_6P_3B_3H_6$ and a 0.0123 g. (0.048 mmole) quantity of crystalline iodine are placed in a 5 ml. heavy-wall tube. The tube is evacuated and 1.0 ml. (0.752 g., 10.43 mmoles) of trimethylaluminum is condensed in from a vacuum line. The sealed tube is heated at $125\pm2°$ C. for 12 hrs. After removal of the unreacted trimethylaluminum the residual white solid is sublimed in high vacuum at a bath temperature up to 175° C. The white solid sublimate (0.1577 g.) proves to be a mixture containing

$(CH_3)_6P_3B_3H_5(CH_3)$ and $(CH_3)_6P_3B_3H_4(CH_3)_2$ by vapor phase chromatographic anaylsis.

EXAMPLE XVI

Into a 7.5 ml. heavy-walled glass tube containing 0.1081 g. (0.328 mmole) of $[(CH_3)_2PBF_2]_3$ is condensed 1.0 ml. (0.75 g., 10.4 mmoles) of trimethylaluminum. The sealed tube is heated for 2 hrs. at 100–105° C., cooled and opened on a vacuum line. No volatile gases are observed. The trimethylaluminum is distilled out and the remaining white residue sublimed in vacuo (75–100° C.) to yield 0.0550 g. of $[(CH_3)_2PB(CH_3)_2]_3$, M.P. 333–335° C. Recrystallization of the sublimate from methanol gives long needles, M.P. 334–336° C.

Following the same procedure, 0.1079 g. (0.327 mmole) of $[(CH_3)_2PBF_2]_3$ and 0.70 ml. (0.526 g., 7.30 mmoles) of trimethylaluminum are heated at $100\pm2°$ C. for 6 hrs. On sublimation of the solid residue at 100–160° C., after removal of the more volatile components of the mixture, there is obtained 0.0932 g. of crude product, $[(CH_3)_2PB(CH_3)_2]_3$, M.P. 322–335° C.

Table I

RELATIVE YIELDS OF PARTIALLY B-HALOGENATED PHOSPHINOBORINE POLYMERS WITH ORGANOMETALLIC REAGENTS

| Example | Reagent | | Reaction | | Percent Distribution of B-Methyl Groups in $(CH_3)_3P_3B_3H_{6-n}\cdot(CH_3)_n$ for Values of $n$ | | | | |
|---|---|---|---|---|---|---|---|---|---|
| | Polymer | Organometallic | Time, hrs. | Temp., °C. | 0 | 1 | 2 | 3 | 4 |
| VI | $(CH_3)_6P_3B_3H_3Br_3$ | $(CH_3)_3Al$ | 18 | 125±2 | 0.1 | 0.3 | 2.5 | 90.1 | 3.9 |
| VII | $(CH_3)_6P_3B_3H_4Br_2$ | $(CH_3)_3Al$ | 18 | 125-155 | 0.9 | 7.2 | 80.2 | 10.0 | 1.7 |
| IX | $(CH_3)_6P_3B_3H_5I$ | $(CH_3)_3Al$ | 9 | 100±2 | 11.1 | 33.8 | 54.7 | 0.3 | 0.1 |
| XII | $(CH_3)_6P_3B_3H_5I$ | $(CH_3)_2Zn$ | 9 | 100±2 | 6.6 | 74.4 | 18.7 | 0.3 | |
| XI | $(CH_3)_6P_3B_3H_5I$ | $(CH_3)_2Cd$ | 9 | 125-135 | 2.2 | 78.9 | 16.4 | 2.5 | |
| X | $(CH_3)_6P_3B_3H_5I$ | $(CH_3)_2Hg$ | 8 | 175-250 | 29.3 | 9.2 | 56.9 | 2.3 | |
| XIII | $(CH_3)_6P_3B_3H_5I$ | $(C_6H_5)_2Mg$ | 24 | 125±5 | 4 | *34 | *11 | | |

*Phenyl.

Table II

| Example | $(R_1)_xM$ | B-halophosphinoborine polymer | B-organophosphinoborine polymer |
|---|---|---|---|
| XVII | $Al(CH_3)_3$ | $[(CH_3)_2PBH_2]_2[(CH_3)_2PBHCl]$ | $[(CH_3)_2PBH_2]_2(CH_3)_2PBH(CH_3)$ |
| XVIII | $B(C_2H_5)_3$ | $CH_2(C_2H_5)PBHCl[CH_3(C_2H_5)PBCl_2]_2$ | $CH_2(C_2H_5)PBH(C_2H_5)[CH_3(C_2H_5)PB(C_2H_5)_2]_2$ |
| XIX | $Zn(CH_3)_2$ | $[(CH_3)_2P]_4B_4H_2Cl_6$ | $[(CH_3)_2P]_4B_4H_2(CH_3)_6$ |
| XX | $Cd(C_3H_7)_2$ | $[(CF_3)_2PBCl_2]_3$ | $[(CF_3)_2PB(C_3H_7)_2]_3$ |
| XXI | $B(CH_3)_3$ | $[(CH_3)_3PBH_2]_3[(CH_3)_2PBHI]CH_3PBH$ | $[(CH_3)_2PBH_2]_3[(CH_3)_2PBH(CH_3)]CH_3PBH$ |
| XXII | $Zn(CH_3)_2$ | $[(CH_3)_2PBCl_2]_4CH_3PBH$ | $[(CH_3)_2PB(CH_3)_2]_4CH_3PBH$ |
| XXIII | $B(CH_3)_3$ | $[(CH_3)_2PBCl_2]_{40}P(CH_3)_3$ | $[(CH_3)_2PB(CH_3)_2]_{40}P(CH_3)_3$ |
| XXIV | $Al(CH_3)_3$ | $[H_2BP(CH_3)(CH_2)_3(CH_3)PBHH]_x[(CH_3)_2PBH_2]_y$ | $[H_2BP(CH_3)(CH_2)_3(CH_3)PBH(C_3)]_x[(CH_3)_2PBH_2]_y$ |
| XXV | $Cd(CH_3)_2$ | $[(CH_2)_3PBCl_2]_3$ | $[(CH_2)_3PB(CH_3)_2]_3$ |
| XXVI | $Zn(CH_3)_2$ | $[(C_6H_5)_2PBCl_2]_3$ | $[(C_6H_5)_2PB(CH_3)_2]_3$ |
| XXVII | $Al(CH_3)_3$ | $[(C_{12}H_{25})_2PBBr_2]_3$ | $[(C_{12}H_{25})_2PB(CH_3)_2]_3$ |
| XXVIII | $Al(C_6H_{13})_3$ | $[(C_6H_{13})_2PBCl_2]_3$ | $[(C_6H_{13})_2PB(C_6H_{13})_2]_3$ |
| XXIX | $Al(C_8H_{17})_3$ | $[(CH_3)_2PBHBr]_3$ | $[(CH_3)_2PBH(C_6H_{17})]_3$ |
| XXX | $Al(CH_3)_3$ | $[CH_2(CH_2)_5PBCl_2]_4$ | $[CH_2(CH_2)_5PBCl_2]_4$ |
| XXXI | $Al[CH(CH_2)_4]_3$ | $[(CH_3)_2PBHBr]_3$ | $((CH_3)_2PBH[CH(CH_2)_4]_3)$ |
| XXXII | $Al[CH_2C_6H_5]_3$ | $[(CH_3)_2PBH_2]_2(CH_3)2PBHCl$ | $[(CH_3)_2PBH_2]_2(CH_3)_2PBH(CH_2C_6H_5)$ |
| XXXIII | $Al[(C_6H_4)CH_3]_3$ | $[(CH_3)_2PBH_2]_3(CH_3)_2PBHBr$ | $[(CH_3)_2PBH_2]_3(CH_3)_2PBH[(C_6H_4)CH_3]$ |
| XXXIV | $B(CH_3)_3$ | $(C_5H_{11})CH_3PBHCl]_3$ | $(C_5H_{11})CH_3PBH(CH_3)]_3$ |
| XXXV | $Zn(CH_3)_2$ | $[CH_3(C_2H_5)PBHBr]_{30}N(CH_3)_3$ | $[CH_3(C_2H_5)PBH(CH_3)]_{30}N(CH_3)_3$ |
| XXXVI | $Cd(C_2H_5)_2$ | $[Br_2BP(CH_3)_2C_6H_4(CH_3)PBBr_2]_n$ | $[(C_2H_5)_2BP(CH_3)_2C_6H_4(CH_3)PB(C_2H_5)_2]_n$ |
| XXXVII | $B(C_3H_7)_3$ | $[I_2BP(CH_3)(CH_2)_{12}(CH_3)PBI_2]_n$ | $[(C_3H_7)_2BP(CH_3)(CH_2)_{12}(CH_3)PB(C_3H_7)_2]_n$ |
| XXXVIII | $Zn(C_4H_9)_2$ | $[I_2BP(CH_3)(CH_2)_8(CH_3)PBI_2]_n$ | $[(C_4H_9)_2BP(CH_3)(CH_2)_8(CH_3)PB(C_4H_9)_2]_n$ |
| XXXIX | $Cd(CH_3)_2$ | $[Cl_2BP(CH_3)CH(CH_2)_2CH(CH_3)PBCl_2]_n$ (with $(CH_2)_2$ bridge) | $[(CH_3)(CH_3)BP(CH_3)CH(CH_2)_2CH(CH_3)PB(CH_3)(CH_3)]_n$ |
| XL | $Al[CH(CH_3)_2]_3$ | $[Cl_2BP(CH_3)CH(CH_2)_2CH(CH_3)PB(CH_3)_2]_n$ | $([(CH_3)_3CH]_2BP(CH_3)CH(CH_2)_2CH(CH_3)PB(CH_3)_2)_n$ |
| XLI | $B[C(CH_3)_3]_3$ | $[ClHBP(CH_3)(CH_2)_4(CH_3)PBH_2]_n$ | $([(CH_3)_3C]HBP(CH_3)(CH_2)_4(CH_3)PBH_2)_n$ |
| XLII | $Zn[C_6H_4C_6H_5]_2$ | $[(CH_3)_2PBBr_2]_nPH(CH_3)_2$ | $[(CH_3)_2PB(C_6H_4C_6H_5)_2]_nPH(CH_3)_2$ |
| XLIII | $Al[CH(CH_2)_3]_3$ | $[(CH_3)_2PBI_2]_nNH(CH_3)_2$ | $((CH_3)_2PB[CH(CH_2)_3]_2)_nNH(CH_3)_2$ |
| XLIV | $B[CH(CH_2)_5]_3$ | $[(CH_3)_2PBHCl]_nP(CH_3)_3$ | $((CH_3)_2PBH[CH(CH_2)_5])_nP(CH_3)_3$ |
| XLV | $Be(CH_3)_2$ | $[(CH_3)_2PBHCl]_3$ | $[(CH_3)_2PBH(CH_3)]_3$ |
| XLVI | $LiC_2H_5$ | $(CH_3)_6P_3B_3H_5Cl$ | $(CH_3)_6P_3B_3H_5(C_2H_5)$ |
| XLVII | $NaCH_3$ | $[(CH_3)_2PBH_2]_2(CH_3)_2PBClH$ | $[(CH_3)_2PBH_2]_2(CH_3)_2PB(CH_3)H$ |
| XLVIII | $KCH_3$ | $(C_3H_7)_6P_3B_3H_5Br$ | $(C_3H_7)_6P_3B_3H_5(CH_3)$ |
| XLIX | $Ca(CH_3)_2$ | $(C_2H_5)_6P_3B_3H_5Cl$ | $(C_2H_5)_6P_3B_3H_5(CH_3)$ |
| L | $Sr(CH_3)_2$ | $(C_2H_5)_6P_3B_3H_5Br$ | $(C_2H_5)_6P_3B_3H_5(CH_3)$ |
| LI | $Ba(CH_3)_2$ | $(CH_3)_6P_3B_3H_5I$ | $(CH_3)_6P_3B_3H_5(CH_3)$ |
| LII | $RbCH_3$ | $(CH_3)_8P_4B_4H_7Br$ | $(CH_3)_8P_4B_4H_7(CH_3)$ |
| LIII | $CsCH_3$ | $(CH_3)_6P_3B_3H_5Cl$ | $(CH_3)_6P_3B_3H_5(CH_3)$ |
| LIV | $Al(CH_3)_3$ | $[(CH_3)_2PBI_2]_2[(CH_3)_2PBH]_2$ | $[(CH_3)_2PB(CH_3)_2]_2[CH_3PBH]_2$ |
| LV | $B(CH_3)_3$ | $[(CH_3)_2PBHI]_4[CH_3PBH]$ | $[(CH_3)_2PB(CH_3)H]_4[CH_3PBH]$ |
| LVI | $Al(CH_3)_2H$ | $[(CH_3)_2PBH_2]_3[(CH_3)_2PBHI]$ | $[(CH_3)_2PBH_2]_3[(CH_3)_2PBH(CH_3)]$ |

EXAMPLE LVI

To 1.5256 g. (4.39 mmoles) of B-monoiododimethylphosphinoborine trimer in a heavy-wall tube is added 1.50 ml. (1.77 g., 14.3 mmoles) of diethylzinc in vacuo. The sealed tube is heated at 100° C. for 10 hrs., opened on a vacuum line and the excess diethylzinc removed. The residual viscous product is heated under high vacuum at 30–50° C. to give 0.9610 g. of a white solid condensate. Analysis by vapor phase chromatography indicates a complex mixture consisting of dimethylphosphinoborine trimer, B-monoethyl-dimethylphosphinoborine trimer, B, B'-diethyldimethylphosphinoborine trimer and dimethylphosphinoethylborine trimer. Pure B-monoethyl-dimethylphosphinborine trimer, M.P. 36.5–37.0° C., is obtained on passing the crude material through a large scale vapor phase chromatograph, cutting the appropriate fraction and subliming this product under high vacuum at 25–30° C.

As illustrated in the foregoing examples, the process of the present invention can be carried out at a temperature within a range of about 0° C. to about 400° C., and preferably within a temperature range of about 25° C. to about 200° C.; however, temperature is not critical so long as the decomposition temperatures of the reactants and products are not exceeded.

The reaction can be carried out in the presence of a solvent or not, as desired. Preferred solvents which can be used according to the present invention include: aliphatic ethers such as diamyl ether, diheptyl ether, isobutyl neopentyl ether, diisopropyl ether, dimethyl ether, ethylene glycol dimethylether, ethylene glycol diethylether, ethylene glycol dipropylether, ethylene glycol dibutylether, diethylene glycol dimethylether, diethylene glycol diethylether, diethylene glycol dipropylether, diethylene glycol dibutylether, triethylene glycol dimethylether, triethylene glycol diethylether, triethylene glycol dipropylether, triethylene glycol dibutylether, triethylene glycol dipropylether, triethylene glycol dibutylether, tetraethylene glycol dimethylether, tetraethylene glycol diethylether, diethyl ether, dipropyl ether, butyl ethyl ether, hexyl methyl ether; arene ethers such as anisole, phenetole, diphenyl ether, veratrole, benzyl phenyl ether; cyclic ethers such as tetrahydrofuran, dioxane, tetrahydropyran; arene or aliphatic hydrocarbons such as diisoamyl, hexane, n-hexadecane, cyclohexane, iso-octane, cyclopentane, trimethylpentane, 2-methylpentane, isopentane, methylcyclohexane, benzene, octadeacyclohexane, toluene, p-xylene, naphtha, butylbenzene, ethylbenzene, cumene, octadecylbenzene and the like.

Mixtures of solvents can be employed if desired. The aliphatic ether solvents are particularly useful because they are inert to the reactants and product, inexpensive, and readily available.

The substituents, $R_1$, $R_2$, $R_3$ and $R_4$, as defined above, can be monovalent alicyclic, acyclic or arene substituents. Typical examples of these monovalent substituents include: aryl substituents such as phenyl, biphenylyl, naphthyl, and indanyl; alkaryl substituents such as cumenyl, tolyl, xylyl, mesityl, benzyl, phenylethyl, phenethyl, diphenylmethyl, α-methylbenzyl, trityl, 2-methylbenzyl and 3-phenylpropyl; alkyl substituents such as methyl, ethyl, propyl, butyl, amyl, neopentyl, decyl, hexyl, 2-methylpentyl, 5-methylhexyl, dodecyl and iso-octyl; and cycloalkyl substituents such as cyclohexyl, cyclopentyl, cycloheptyl, 4-methylcyclohexyl, 2,4,6-trimethylcyclohexyl and 3-isopropylcyclopentyl. Preferred substituents include the aryl substituent, phenyl; the alkaryl substituents, lower alkyl substituted phenyl; the lower alkyl substituents having from 1 to 12 carbon atoms; and the cycloalkyl substituents having 5 or 6 annular carbon atoms. These substituents have been found to produce the most desirable results. The most preferred substituents are the lower alkyl substituents having from 1 to 12 carbon atoms and the phenyl radical because the reactions proceed easily and the products are particularly useful and stable compounds.

The bivalent substituents, $R_3$ and $R_4$ when taken together as one single substituent and R, as defined above, can be any of the bivalent arene, alicyclic or acyclic substituents. Typical examples of these bivalent substituents include: arylene substituents such as phenylene, naphthylene, acenaphthenylene and biphenylene; alkarylene substituents such as durylene, benzylidene, xylylene and tolylene; alkylene substituents such as methylene, ethylene, hexamethylene, neopentylene, isobutylene, propylene and tetramethylene; and cycloalkylene substituents such as cyclohexylene and cyclopentylene. Preferred substituents include the aryl substituent, phenylene; the alkarylene substituents which are lower alkyl substituted phenylene; the lower alkylene substituents having from 1 to 12 carbon atoms; and the cycloalkylene substituents having 5 or 6 annular carbon atoms. The most preferred substituents are the lower alkylene substituents having from 1 to 12 carbon atoms. These substituents have been found to produce the most desirable results and the reactions proceed easily in their presence.

The B-halophosphinoborine polymers used according to this invention include the following:

$[(CH_3)_2PBH_2]_2(CH_3)_2PBHF$
$(CH_3)_2PBH_2[(CH_3)_2PBHI]_2$
$[(CH_3)_2PBHCl]_3$
$[(CH_3)_2PBHI]_3$
$[(CH_3)_2PBHCl]_2(CH_3)_2PBCl_2$
$[(CH_3)_2PBHBr]_2(CH_3)_2PBBr_2$
$[(CH_3)_2PBHI]_2(CH_3)_2PBI_2$
$(CH_3)_2PBHCl[(CH_3)_2PBCl_2]_2$
$(CH_3)_2PBHBr[(CH_3)_2PBBr_2]_2$
$(CH_3)_2PBHI[(CH_3)_2PBI_2]_2$
$[(CH_3)_2PBF_2]_3$
$[(CH_3)_2PBH_2]_3(CH_3)_2PBHBr$
$[(CH_3)_2PBH_2]_3[(CH_3)_2PBHBr]CH_3PBH$
$[(C_2H_5)_2PBF_2]_3$
$[(CH_3)_2PBH_2]_2(CH_3)_2PBHCl$
$(CH_3)_2PBH_2[(CH_3)_2PBHCl]_2$
$[(CH_3)_2PBCl_2]_3$
$CH_3(C_2H_5)PBHCl[CH_3(C_2H_5)PBCl_2]_2$
$[CH_3(C_2H_5)PBCl_2]_3$
$[(CH_3)_2PBH_2]_2(CH_3)_2PBHBr$
$(CH_3)_2PBH_2[(CH_3)_2PBHBr]_2$
$[(CH_3)_2PBHBr]_3$
$[(CH_3)_2PBBr_2]_3$
$[(CH_3)_2PBH_2]_2(CH_3)_2PBHI$
$[(CH_3)_2PBI]_3$
$[(CH_3)_2P]_4B_4H_2Cl_6$
$[(CH_3)_2PBH_2]_3[(CH_3)_2PBHI]CH_3PBH$
$[(CH_3)_2PBCl_2]_nN(C_2H_5)_3$
$[(CH_3)_2PBCl_2]_4CH_3PBH$

The following specific compounds exemplify the general structure of the polymers used in this invention:

A typical B-halophosphinoborine polymer which is characteristic of the structure of polymers having the general formula (1) $\qquad [R_4R_3PBR_1R_2]_n$ is the trimeric B-bromo-P-dimethylphosphinoborine where n equals 3 having the structural formula:

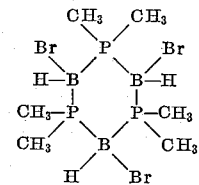

A typical B-halophosphinoborine polymer which is characteristic of the structure of polymers having the general formula (2) $\qquad [R_4R_3PBR_1R_2]_nA$ is the linear polymer B-iodo-P-dimethylphosphinoborine having a degree of polymerization of 3, terminated with an acidic borine group on one end and a basic secondary phosphorine on the other, and having the structural formula:

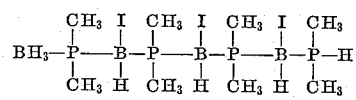

A typical B-halophosphinoborine polymer which is characteristic of the structure of polymers having the general formula (3) 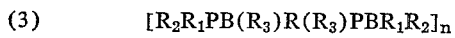

is the separate ring polymer having the formula:

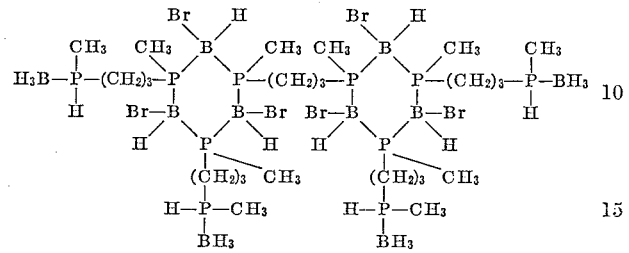

A typical B-halophosphinoborine polymer which is characteristic of the structure of polymers having the general formula (4) $[R_4R_3PBR_1R_2]_m[R_3PBR_1]_z$ is the fused ring polymer having the formula:

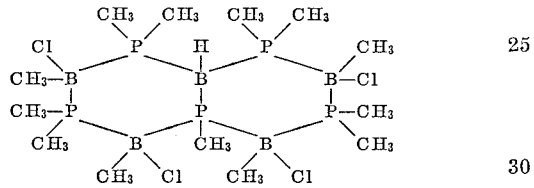

The metallic substituent M can be any of the following Group III A metals, boron or aluminum; Group II B metals, zinc, cadmium, or mercury; Group II A metals (alkaline earth metals), beryllium, magnesium, calcium strontium, or barium; or Group I A metals (alkali metals), lithium, sodium, potassium, rubidium, or cesium. Generally, within a particular group, the yield of B-organophosphinoborine polymer decreases with increasing atomic number of metallic element. The best yields of substituted polymer are generally obtained when the metallic elements are boron, aluminum, zinc, cadmium, beryllium, magnesium, lithium, sodium, and potassium, and our most preferred metallic elements are magnesium, boron, aluminum, zinc and cadmium.

The polymer which has the general Formula 3 is terminated, as indicated above in the specific structural formula, with acidic groups. The number of acidic groups varies with the specific structure of the polymer and can range from 4 to about $n+2$. The acidic terminating groups on polymer (3) can be any of those defined above with reference to Formula 1. These groups are acidic by the Lewis acid concept of acidity.

The terminating group, —A, in polymer (2) is basic in nature. Substantially any groups, organic or inorganic, which are basic enough to attach to the acidic boron group, which is the end of the polymer chain, will terminate the chain. Convenient terminating groups include the secondary and tertiary phosphines and amines which can be represented by the general formula —$D(R_3)_3$, where D is either phosphorous or nitrogen and $R_3$ is as defined above with the provision that no more than one $R_3$ in any one group is hydrogen. The nature of the inert basic end groups is not critical in this invention since it does not enter into the reaction in any way and is present only because any linear polymer must be terminated in order to prevent cyclization.

The ratio of $m$ to $z$ in polymer (4) above, determines the extent to which the rings in the polymer are fused together. The larger $z$ is with respect to $m$ the greater the number of ring fusions in the polymer. Thus, if the ratio of $m$ to $z$ is 1:1 or less, the rings are highly fused, while if the ratio is 6:1 or greater, generally the rings are larger and contain more annular phosphinoborine groups with few ring fusions. The ratio of $m$ to $z$ can be as low as about 0.1:1 and as high as about 6:1. Preferably the ratio of $m$ to $z$ is between about 0.5:1 and 4:1 since these are the easiest to produce and have very desirable physical properties. Polymers which have a ratio close to 0.5:1 are highly cross-linked solids while those having a ratio close to 4:1 are generally viscous liquids.

The integer $n$, which is indicative of the degree of polymerization of polymers (1) and (2), can range from two for the simple linear polymers and three for the simple cyclic polymers through 3,000 and even higher.

As will be understood by those skilled in the art, what has been described is the preferred embodiment of the invention; however, many modifications, changes and substitutions can be made therein without departing from the scope and the spirit of the following claims.

We claim:
1. Process for the production of a B-organo-substituted phosphinoborine polymer comprising:
 (a) admixing and
 (b) reacting
  (I) a B-halophosphinoborine polymer selected from the group consisting of:
   (1) $[R_4R_3PBR_1R_2]_n$,
   (2) $[R_4R_3PBR_1R_2]_nA$,
   (3) $[R_2R_1BP(R_3)R(R_3)PBR_1R_2]_n$,
   (4) $[R_4R_3PBR_1R_2]_m[R_3PBR_1]_z$, and mixtures thereof, wherein,
    $R_1$ and $R_2$ are each independently selected for each monomeric unit from the group consisting of halogen, hydrogen, aryl, alkyl, alkaryl and cycloalkyl substituents; at least one of said $R_2$ and $R_1$ being halogen in each of polymers (1), (2), (3), and (4);
    $R_3$ and $R_4$ are selected for each monomeric unit from the group consisting of two independently selected aryl, alkyl, alkaryl and cycloalkyl substituents,
    R is selected from the group consisting of arylene, alkylene, alkarylene and cycloalkylene substituents;
    $n$ is an integer indicative of the degree of polymerization of said polymers;
    $m$ and $z$ are integers the ratio of which is indicative of the degree of ring fusion in said polymer (4);
    A is a basic terminating group; with
  (II) an organometallic reagent having the formula $(R_1)_xM$, wherein,
    $x$ is an integer equal to the valence of M;
    M is selected from the group consisting of boron, aluminum, zinc, cadmium, mercury, alkaline earth metals and alkali metals;
    $R_1$ is selected from the group consisting of halogen, hydrogen, aryl, alkyl, alkaryl and cycloalkyl substituents wherein at least one substituent $R_1$ in each said organometallic reagent is an organic substituent; and
 (c) recovering said B-organo-substituted phosphinoborine polymer.

2. Process for the production of a B-organo-substituted phosphinoborine polymer comprising:
 (a) admixing and
 (b) reacting
  (I) a B-halophosphinoborine polymer selected from the group consisting of:
   (1) $[R_4R_3PBR_1R_2]_n$,
   (2) $[R_4R_3PBR_1R_2]_nA$,
   (3) $[R_2R_1BP(R_3)R(R_3)PBR_1R_2]_n$,
   (4) $[R_4R_3PBR_1R_2]_m[R_3PBR_1]_z$, and mixtures thereof, wherein,
    $R_1$ and $R_2$ are each independently selected for each monomeric unit from the group consisting of halogen, hydrogen, aryl, alkyl, alkaryl and cycloalkyl substituents; at least one of said $R_1$ and $R_2$ being halogen in each of said polymers (1), (2), (3), and (4);

$R_3$ and $R_4$ are selected for each monomeric unit from the group consisting of two nidependently selected aryl, alkyl, alkaryl and cycloalkyl substituents;

R is selected from the group consisting of arylene, alkylene, alkarylene and cycloalkylene substituents;

n is an integer indicative of the degree of polymerization of said polymers;

m and z are integers the ratio of which is indicative of the degree of ring fusion in said polymer (4);

A is a basic terminating group; with (II) an organometallic reagent having the formula $(R_1)_3Al$, wherein, $R_1$ is selected from the group consisting of halogen, aryl, alkyl, alkaryl and cycloalkyl substituents wherein at least one substituent $R_1$ in each said organometallic reagent is an organic substituent; and (c) recovering said B-organo-substituted phosphinoborine polymer.

3. Process for the production of a B-organo-substituted phosphinoborine polymer comprising:
(a) admixing and
(b) reacting
(I) a B-halophosphinoborine polymer selected from the group consisting of
(1) $[R_4R_3PBR_1R_2]_n$,
(2) $[R_4R_3PBR_1R_2]_nA$,
(3) $[R_2R_1BP(R_3)R(R_3)PBR_1R_2]_n$,
(4) $[R_4R_3PBR_1R_2]_m[R_3PBR_1]_z$, and mixtures thereof, wherein, $R_1$ and $R_2$ are each independently selected for each monomeric unit from the group consisting of halogen, hydrogen, aryl, alkyl, alkaryl and cycloalkyl substituents; at least one of said $R_1$ and $R_2$ being halogen in each of said polymers (1), (2), (3), and (4);

$R_3$ and $R_4$ are selected for each monomeric unit from the group consisting of two independently selected aryl, alkyl, alkaryl and cycloalkyl substituents;

R is selected from the group consisting of arylene, alkylene, alkarylene and cycloalkylene substituents;

n is an integer indicative of the degree of polymerization of said polymers;

m and z are integers the ratio of which is indicative of the degree of ring fusion in said polymer (4);

A is a basic terminating group; with (II) an organometallic reagent having the formula $(R)_3Zn$, wherein, $R_1$ is selected from the group consisting of halogen, hydrogen, aryl, alkyl, alkaryl, and cycloalkyl substituents wherein at least one substituent $R_1$ in each said organometallic reagent is an organic substituent; and (c) recovering said B-organo-substituted phosphinoborine polymer.

4. Process for the production of a B-organo-substituted phosphinoborine polymer comprising:
(a) admixing and
(b) reacting
(I) a B-halophosphinoborine polymer selected from the group consisting of:
(1) $[R_4R_3PBR_1R_2]_n$,
(2) $[R_4R_3PBR_1R_2]_nA$,
(3) $[R_2R_1BP(R_3)R(R_3)PBR_1R_2]_n$,
(4) $[R_4R_3PBR_1R_2]_m[R_3PBR_1]_z$, and mixtures thereof, wherein, $R_1$ and $R_2$ are each independently selected for each monomeric unit from the group consisting of halogen, hydrogen, aryl, alkyl, alkaryl and cycloalkyl substituents; at least one of said $R_1$ and $R_2$ being halogen in each of said polymers (1), (2), (3), and (4);

$R_3$ and $R_4$ are selected for each monomeric unit from the group consisting of two independently selected aryl, alkyl, alkaryl and cycloalkyl substituents;

R is selected from the group consisting of arylene, alkylene, alkarylene and cycloalkylene substituents;

n is an integer indicative of the degree of polymerization of said polymers;

m and z are integers the ratio of which is indicative of the degree of ring fusion in said polymer (4);

A is a basic terminating group; with (II) an organometallic reagent having the formula $(R_1)_2Cd$, wherein, $R_1$ is selected from the group consisting of halogen, hydrogen, aryl, alkyl, alkaryl and cycloalkyl substituents wherein at least one substituent $R_1$ in each said organometallic reagent is an organic substituent; and (c) recovering said B-organo-substituted phosphinoborine polymer.

5. Process for the production of a B-organo-substituted phosphinoborine polymer comprising:
(a) admixing and
(b) reacting
(I) a B-halophosphinoborine polymer selected from the group consisting of:
(1) $[R_4R_3PBR_1R_2]_n$,
(2) $[R_4R_3PBR_1R_2]_nA$,
(3) $[R_2R_1BP(R_3)R(R_3)PBR_1R_2]_n$,
(4) $[R_4R_3PBR_1R_2]_m[R_3PBR_1]_z$, and mixtures thereof, wherein, $R_1$ and $R_2$ are each independently selected for each monomeric unit from the group consisting of halogen, hydrogen, aryl, alkyl, alkaryl and cycloalkyl substituents; at least one of said $R_1$ and $R_2$ being halogen in each of said polymers (1), (2), (3), and (4);

$R_3$ and $R_4$ are selected for each monomeric unit from the group consisting of two independently selected aryl, alkyl, alkaryl and cycloalkyl substituents;

R is selected from the group consisting of arylene, alkylene, alkarylene and cycloalkylene substituents;

n is an integer indicative of the degree of polymerization of said polymers;

m and z are integers the ratio of which is indicative of the degree of ring fusion in said polymer (4);

A is a basic terminating group; with (II) an organometallic reagent having the formula $(R_1)_3B$, wherein, $R_1$ is selected from the group consisting of halogen, hydrogen, aryl, alkyl, alkaryl and cycloalkyl substituents wherein at least one substituent $R_1$ in each said organometallic reagent is an organic substituent; and (c) recovering said B-organo-substituted phosphinoborine polymer.

6. Process for the production of a B-organo-substituted phosphinoborine polymer comprising:
   (a) admixing and
   (b) reacting
      (I) a B-halophosphinoborine polymer selected from the group consisting of:
         (1) $[R_4R_3PBR_1R_2]_n$,
         (2) $[R_4R_3PBR_1R_2]_nA$,
         (3) $[R_2R_1BP(R_3)R(R_3)PBR_1R_2]_n$,
         (4) $[R_4R_3PBR_1R_2]_m[R_3PBR_1]_z$, and mixtures thereof, wherein,
            $R_1$ and $R_2$ are each independently selected for each monomeric unit from the group consisting of halogen, hydrogen, aryl, alkyl, alkaryl and cycloalkyl substituents; at least one of said $R_1$ and $R_2$ being halogen in each of said polymers (1), (2), (3), and (4);
            $R_3$ and $R_4$ are selected for each monomeric unit from the group consisting of two independently selected aryl, alkyl, alkaryl and cyloalkyl substituents;
            R is selected from the group consisting of arylene, alkylene, alkarylene and cycloalkylene substituents;
            $n$ is an integer indicative of the degree of polymerization of said polymers;
            $m$ and $z$ are integers the ratio of which is indicative of the degree of ring fusion in said polymer (4);
            A is a basic terminating group; with
      (II) an organometallic reagent having the formula $(R_1)_xM$, wherein,
         $x$ is an integer equal to the valence of M;
         M is selected from the group consisting of boron, aluminum, zinc, cadmium, mercury, alkaline earth metals and alkali metals;
         $R_1$ is as defined above wherein at least one substituent $R_1$ in each said organometallic reagent is an organic substituent and one substituent $R_1$ in each said organometallic reagent is a halogen; and
   (c) recovering said B-organo-substituted phosphino-borine polymer.

7. Process for the production of a B-organo-substituted phosphinoborne polymer comprising:
   (a) admixing and
   (b) reacting
      (I) $[(CH_3)_2PBCl_2]_3$; with
      (II) $Al(CH_3)_3$; and
   (c) recovering said B-organo-substituted phosphinoborine polymer.

8. Process for the production of a B-organo-substituted phosphinoborine polymer comprising:
   (a) admixing and
   (b) reacting
      (I) $(CH_3)_6P_3B_3H_5I$; with
      (II) $Zn(CH_3)_2$; and
   (c) recovering said B-organo-substituted phosphinoborine polymer.

9. Process for the production of a B-organo-substituted phosphinoborine polymer comprising:
   (a) admixing and
   (b) reacting
      (I) $(CH_3)_6P_3B_3F_6$; with
      (II) $B(CH_3)_3$; and
   (c) recovering said B-organo-substituted phosphinoborine polymer.

10. Process for the production of a B-organo-substituted phosphinoborine polymer comprising:
    (a) admixing and
    (b) reacting
       (I) $(CH_3)_6P_3B_3H_5I$; with
       (II) $Mg(C_6H_5)_2$; and
    (c) recovering said B-organo-substituted phosphinoborine polymer.

11. Process for the production of a B-organo-substituted phosphinoborine polymer comprising:
    (a) admixing and
    (b) reacting
       (I) $(CH_3)_6P_3B_3H_5I$; with
       (II) $(C_6H_5)MgBr$; and
    (c) recovering said B-organo-substituted phosphinoborine polymer.

12. Process for the production of a B-organo-substituted phosphinoborine polymer comprising:
    (a) admixing and
    (b) reacting
       (I) $(CH_3)_6P_3B_3H_5I$; with
       (II) $(C_2H_5)_2Zn$; and
    (c) recovering said B-organo-substituted phosphinoborine polymer.

13. Process for the production of a B-organo-substituted phosphinoborine polymer comprising:
    (a) admixing and
    (b) reacting
       (I) a B-halophosphinoborine polymer selected from the group consisting of
          (1) $[R_4R_3PBR_1R_2]_n$,
          (2) $[R_4R_3PBR_1R_2]_nA$,
          (3) $[R_2R_1BP(R_3)R(R_3)PBR_1R_2]_n$,
          (4) $[R_4R_3PBR_1R_2]_m[R_3PBR_1]_z$, and mixtures thereof, wherein,
             $R_1$ and $R_2$ are each independently selected for each monomeric unit from the group consisting of halogen, hydrogen, aryl, alkyl, alkaryl and cycloalkyl substituents; at least one of said $R_1$ and $R_2$ being halogen in each of said polymers (1), (2), (3), and (4);
             $R_3$ and $R_4$ are selected for each monomeric unit from the group consisting of one single bivalent arylene, alkylene, alkarylene and cycloalkylene substituent;
             R is selected from the group consisting of arylene, alkylene, alkarylene and cycloalkylene substituent;
             $n$ is an integer indicative of the degree of polymerization of said polymers;
             $m$ and $z$ are integers the ratio of which is indicative of the degree of ring fusion in said polymer (4);
             A is a basic terminating group; with
       (II) an organometallic reagent having the formula $(R_1)_xM$, wherein
             $x$ is an integer equal to the valence of M;
             M is selected from the group consisting of boron, aluminum, zinc, cadmium, mercury, alkaline earth metals and alkali metals;
             $R_1$ is selected from the group consisting of halogen, hydrogen, aryl, alkyl, alkaryl and cycloalkyl substituents wherein at least one substituent $R_1$ in each said organometallic reagent is an organic substituent; and
    (c) recovering said B-organo-substituted phosphinoborine polymer.

No references cited.

TOBIAS E. LEVOW, *Primary Examiner.*

LEON D. ROSDOL, *Examiner.*